United States Patent [19]

Coburn

[11] Patent Number: 4,499,680
[45] Date of Patent: Feb. 19, 1985

[54] IDENTIFICATION BAND

[76] Inventor: James A. Coburn, 2 Coburn La., Whitewater, Wis. 53190

[21] Appl. No.: 612,251

[22] Filed: May 21, 1984

Related U.S. Application Data

[63] Continuation of Ser. No. 344,184, Jan. 29, 1982.

[51] Int. Cl.³ .............................................. G09F 3/00
[52] U.S. Cl. ..................................... 40/304; 40/21 C; 24/16 PB; 24/17 AP
[58] Field of Search ............... 40/21 R, 21 C, 20, 304; 24/16 PB, 17 PB

[56] References Cited

U.S. PATENT DOCUMENTS

| | | | |
|---|---|---|---|
| 1,785,104 | 12/1930 | Wittmayer | 40/21 UX |
| 2,103,292 | 12/1937 | Leach | 40/304 |
| 2,979,794 | 4/1961 | De Bartolo | 40/21 UX |
| 3,149,808 | 9/1964 | Weckesser | 24/16 PB |
| 3,214,808 | 11/1965 | Litwin | 40/21 UX |
| 3,653,099 | 4/1972 | Hoffman | 24/16 PB |
| 3,708,835 | 3/1972 | Bienz | 40/21 R |
| 3,744,691 | 7/1973 | Shears | 40/21 C |
| 3,837,047 | 9/1974 | Bunnell | 24/16 PB |
| 3,889,411 | 6/1975 | Laughrty et al. | 40/21 C |
| 3,988,812 | 11/1976 | Kanzake | 40/21 UX |
| 4,214,349 | 7/1980 | Munch | 24/16 PB |

Primary Examiner—Gene Mancene
Assistant Examiner—Wenceslao J. Contreras
Attorney, Agent, or Firm—Andrus, Sceales, Starke & Sawall

[57] ABSTRACT

A plastic identification band for milking cows is formed as a strap of a width to receive identifying indicia and a length for attachment to and about the leg of a cow. A rectangular buckle at one end has a bottom wall coplanar with the strap and an upper wall defining an opening to receive the outer end of the strap. The bottom wall of the buckle includes a plurality of upwardly facing teeth extending longitudinally of the buckle. The strap has a plurality of similar teeth on the underside thereof. The upper buckle wall is a flexible wall which is deflected slightly inwardly toward the bottom wall and has a narrow, longitudinally extending ridge projecting inwardly from the upper buckle wall within the buckle toward said buckle teeth to hold the strap teeth firmly engaged with the bottom wall buckle teeth upon insertion of the strap into the buckle.

3 Claims, 7 Drawing Figures

IDENTIFICATION BAND

This application is a continuation of application Ser. No. 06/344,184, filed Jan. 29, 1982.

BACKGROUND OF THE PRESENT INVENTION

This invention relates to an identification band and particularly to a releasable loop-type band for attachment to the ankle or leg of cattle or the like for identification thereof.

Modern milking systems employ various milking parlors wherein the cows are sequentially located in a milking stall and coupled to automatic milking equipment. The milking parlors generally include a control or operating pit within which personnel is conveniently located for coupling and decoupling of the milking equipment and generally monitoring the milking operation.

The operator generally wishes to monitor the milk production of the individual cows. This of course requires some means of identifying each cow. A current method uses an identification band about the ankle or foreleg of the cow, with appropriate identification indicia such as a number or the like on the band. A known identification band consists of an elongated strap member having a buckle at one end and adapted to receive the free end of the outer strap. The buckle and strap have a releasable connection. For example, U.S. Pat. No. Des. 250,423 discloses an ankle identification tag for attachment to a cow or similar animal. The tag is a strap-like member having a plurality of ratcheting teeth on one end and adapted to be releasably interconnected with similar teeth on the top wall of a buckle member at the opposite end. The buckle structure is typical of the devices presently used in cow identification applications. The buckle structure is a relatively rectangular structure including an upper wall including multiple teeth aligned with an opening in the bottom wall of the buckle. The free end of the strap is adapted to be looped about the leg of the animal introduced into the outer free end of the buckle to affect interengagement between the buckle teeth and the strap teeth. The area between the strap teeth and the buckle is generally a flat surface within which suitable indicia can be provided by writing or imprinting. In structures of this type, the bottom wall opening has been closed by a separate molding or bonding of a plastic cover to the underside of the strap. Such, of course, requires a further operation and contributes to the cost of the product. Various other bands have been suggested, for example, as shown in the following patents. U.S. Pat. Nos. 3,020,657, J. L. Clark, Feb. 13, 1962, 3,106,028, J. G. Baumgartner, Oct. 8, 1963, 3,214,808, W. J. Litwin, Nov. 2, 1965, 3,279,107, J. G. Baumgartner, Oct. 18, 1966.

All of the patents directly relate to an identification tag structure or band useable as shown or adapted to be constructed of an appropriate size for use as a cow identification tag. For example, the Litwin U.S. Pat. No. 3,214,808 discloses a holding band for clamping a member to an associated structure. The holding band includes a multiple buckle structure with a buckle member essentially corresponding to that of the above described design U.S. Pat. No. Des. 250,423, and in particular having the ratchet teeth on the upper buckle wall aligned with an opening in the bottom wall. Two different embodiments are illustrated, one of which has strap teeth located on the bottom of the strap and the other having teeth located on the top wall of the strap. In both instances, the band is intended to be used with the strap looped on itself and into the buckle from the strap end of the buckle or through the special aligned opening in the bottom wall of the buckle. With the teeth applied to the top wall of the strap, the strap is coupled to the buckle in the same manner as in the previously identified design patent. With the teeth applied to the bottom of the strap, special threading of the strap through the bottom wall opening is provided or the strap is inserted through the strap end of the buckle. The illustrated buckle structures, as well as others such as shown in the above prior art, all similarly function to provide a releasable loop means for interengagement with another object or objects.

Although such devices are thus well known and available, all prior art devices known to the present inventor present difficulty with respect to molding and/or creation of a reliable attachment, particularly while permitting a ready release where desired. Thus, the molding of the teeth in the buckle structure and particularly in combination with the teeth on the top wall or surface of the strap require special molding. Further, the prior art buckle structures may be somewhat difficult to assemble and provide as reliable an interconnection as often desired.

SUMMARY OF THE PRESENT INVENTION

The present invention is particularly directed to an attachment band having a releasable buckle-type interconnection particularly adapted to practical molding of the band from a plastic or other suitable material and also providing a buckle structure having an improved holding and release characteristic. Generally in accordance with the teaching of the present invention, the identification band is formed as an elongated member including a strap with a rectangular buckle structure at one end thereof. The buckle structure includes a bottom wall sufficiently as an extension of the strap with an upper overlying clamping top wall. The bottom wall of the buckle includes a plurality of inwardly projecting and laterally extended teeth. The outer end of the strap is provided with a plurality of similar teeth formed on the underside of the strap and extending throughout a predetermined length of the outer end portion of the strap. The combination of the bottom wall buckle teeth with the bottom side strap teeth permits the looping of the strap with the entrance of the free end of the strap into the free outer end of the buckle. This arrangement of teeth and buckle particularly adapts the band to an improved simplified molding of the band. The overlying top wall of the buckle firmly engages the smooth top wall of the strap in the buckled position to establish a firm interengagement of the assembly. In order to ensure ease of assembly and further to establish an improved holding action, the buckle member is further specially constructed, in accordance with another feature of the present invention, with an inner clamping ridge on the top wall projecting downwardly within the buckle opening. In the band closed position, the inner clamping ridge interengages the smooth top wall of the strap to firmly hold the teeth engaged while permitting convenient release. The clamping ridge is further constructed, in an optimum construction, as a tapered member defining a relatively large entrance end and extending inwardly to exert an increasing force on the strap. This has been found to provide ease in assembly while simultaneously creating an improved holding action.

The formation of the teeth on the underside of the band provides a complete smooth exposure of the strap to the opposite sides of the buckle and around the animal's leg. This creates a maximum smooth area for receiving the identification indicia or the like.

The present invention particularly provides an improved identification band construction particularly adapted to plastic molding with a maximum exposed identification surface and a band having an improved buckle connection.

DESCRIPTION OF THE DRAWING FIGURES

The drawing furnished herewith illustrates a preferred construction of the present invention in which the above advantages and features are clearly disclosed as well as others which will be readily understood from the following description.

DESCRIPTION OF THE ILLUSTRATED EMBODIMENT

Figure 1:
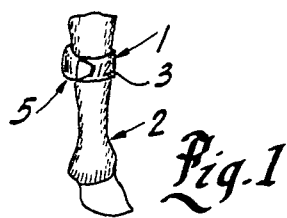
FIG. 1 is a pictorial view of an identification band attached to the leg of a cow.
Figure 7:
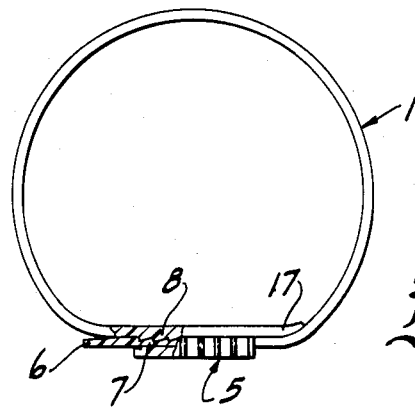
FIG. 7 is a side view with the strap and buckle engaged.
Figure 6:
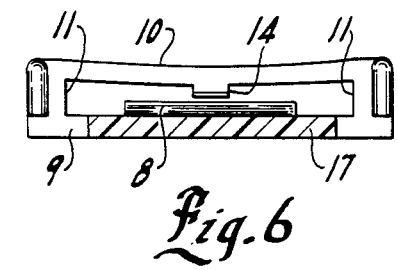
FIG. 6 is an end view taken generally on line 6—6 of FIG. 5.
Figure 2:
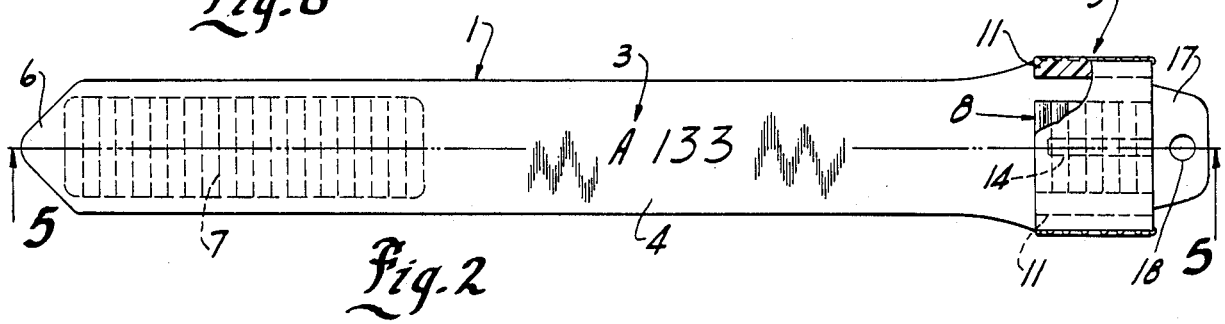
FIG. 2 is a plan view of the identification band shown in FIG. 1.
Figure 3:
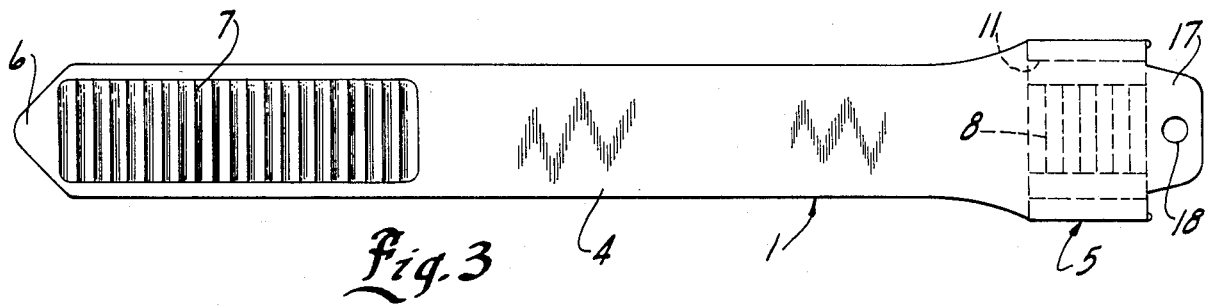
FIG. 3 is a bottom view of the band shown in FIGS. 1 and 2.
Figure 4:
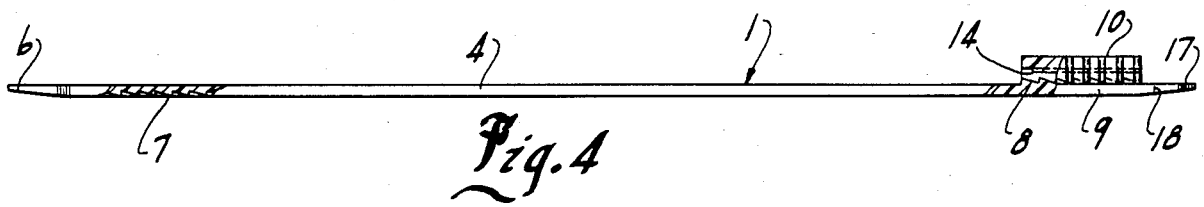
FIG. 4 is a side elevational view of the identification band.

Referring to the drawings and particularly to FIG. 1, an identification band or tag 1, constructed in accordance with the teaching of the present invention, is shown secured about the leg 2 of a cow, not otherwise shown. The illustrated band 1 includes identifying indicia 3 shown as a combination of numbers and letters. The band 1 may be provided in blank and numbered by the user, or provided with any other suitable identifying information. The band may also be formed with factory printed information. For example, in practice, in addition to clear bands, various factory imprinted bands will generally be provided including any one suitable word or words, such as "caution," "dry" or "treated."

The identification band 1, as most clearly shown in FIGS. 2-5, is an elongated strap-like member consisting of a relatively flat elongated strap 4 with a buckle 5 integrally formed to the one end of the strap 4. The identifying indicia 3 is applied to the flat top or upper surface which is located to buckle side of the band 1. This indicia surface is formed as a substantially smooth surface but may of course be formed in any desired manner and even with impressed indicia.

The strap 4 is adapted to be looped about the leg 2 of the cow as shown in FIG. 1 with the free outer tip 6 of the strap inserted into and through the buckle 5. The underside or bottom of the strap 4 includes a plurality of longitudinally spaced teeth 7 which engage a corresponding plurality of teeth 8 formed on the bottom wall 9 of the buckle 5 to form a linear ratcheted connection. The buckle 5 and strap 4 are thereby adapted to be releasably interconnected to each other by the interengaging teeth 7-8. The present invention is particularly constructed to band 1 which is readily constructed and which also provides firm interengagement of the teeth 7-8 for reliable attachment of the identification band 1.

More particularly, the buckle 5 in the illustrated embodiment of the invention is generally a rectangular buckle. The buckle 5 includes a top or outer wall 10 extending across the width of the strap and interconnected by a pair of similar side walls 11 to the bottom wall 9 of the buckle 5. The bottom wall 9 of bucket 5 is integrally formed as a coplanar extension of the strap 4. The buckle 5 is made somewhat wider than the strap 4 with the side walls 11 spaced to define a strap opening of a width generally corresponding to but slightly greater than the width of the sample 4. The top wall 10 and side walls 11 are integrally formed and affixed to the bottom wall.

Figure 5:
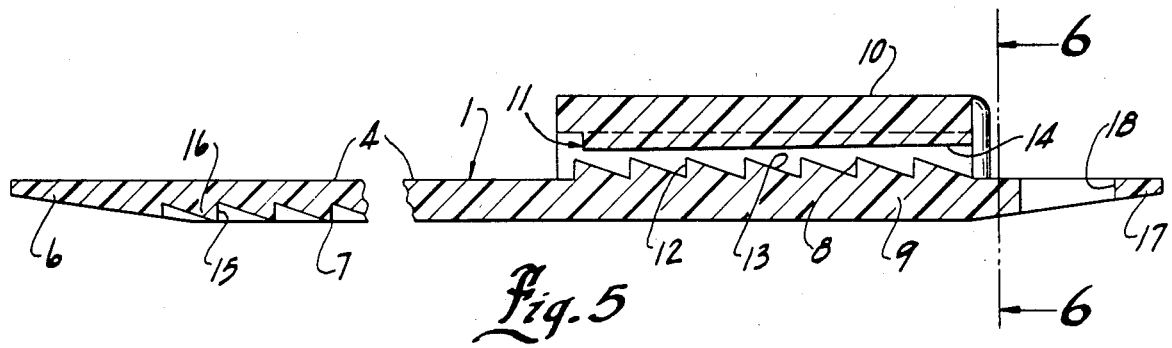
FIG. 5 is an enlarged vertical section taken generally on line 5—5 of FIG. 2.

The bottom wall 9 of buckle 5 has the teeth 8 integrally formed therein in accordance with typical ratchet type teeth, as shown most clearly in FIG. 5. Each tooth 8 thus has a generally flat slightly inclined latch surface 12 extending outwardly from the bottom wall of the buckle with a longer inclined cam surface 13 extending toward the outer end of the buckle 5. The top wall 10 of the buckle is preferably molded to collapse slightly toward the teeth and bottom wall. Further, a centrally located clamping ridge 14 is provided on the inner surface of the top wall 10. The ridge 14 projects inwardly of the buckle opening and has a width which is preferably very small compared to the width of the teeth 8 and buckle 5. The ridge 14 further is an optimum construction formed with a longitudinal taper, as shown most clearly in FIG. 5, which is relatively thin at the one entrance end of the buckle 5 and which increases in depth to the opposite end of the buckle. Thus, the ridge 14 engages the smooth top wall or surface of the strap 4 in the assembled relation and holds the strap 4 with its teeth 7 in firm reliable interengagement with the buckle teeth 8.

The strap 4 is an elongated strap member having a substantial width and preferably terminating in the outer end in the smooth triangular attachment end 6. The attachment tip or end 16 is also preferably tapered to define a relatively thin outermost tip, as most clearly shown in FIG. 5, for ready insertion into the buckle opening.

The strap teeth 7 are formed to the underside of the strap 4 along a predetermined length of the outer attachment end portion. Thus in the illustrated embodiment of the invention, the teeth 7 extend approximately one third the length of the strap 4. Each tooth 7 is constructed to complement tooth 8 and thus with a slightly inclined clamping wall 15 extending substantially normal of the plane of the strap and an oppositely extended cam tooth surface 16 extending from the clamping wall 15 toward the tip end of the strap 4.

The leg band 1 is typically formed of a width of approximately one and one eighth inch wide and a length approximately one foot in length. The buckle is approximately one inch in length and one and one half inches in width, with a buckle opening slightly larger than the one and one eighth inch width of the strap.

Thus, in operation the strap, with or without the desired indicia 3 thereon, is wrapped about the leg 2 of the animal, with the buckle 5 facing outwardly. The free end or tip 6 of the strap 4 is inserted into the outer end of the buckle 5 and forced into the buckle opening with the teeth 7 of the strap 4 moving into ratcheting engagement with the teeth 8 on the bottom wall 9 of the buckle 5. The strap 4 is drawn through the buckle 5 until the band 1 is firmly attached to the leg 2.

In the assembly, the strap is readily inserted into the outer end of the buckle as the result of the flexibility in the buckle walls and the smooth tapered end of the strap, even though partially closed by the clamping ridge 15. In the assembled relation, the clamping ridge 14 firmly forces the holds the teeth in ratcheted engagement to provide a firm interconnection of the identification band 1 to the leg 2 of the animal. The engaged teeth may be released by insertion of a suitable flat tool, such as a blade-like member, between the teeth from the strap-side of the buckle.

The buckle construction, with the teeth 8 formed on the bottom wall of the buckle 5 and in the same plane as the top wall of the strap 4 and with the strap teeth 7 formed on the bottom side thereof, permits direct molding of the strap in a simple mold. The release of the strap from the mold is accomplished by mere separation of the mold without the necessity of any special arrangement. The outer clamping wall with the clamping ridge 14 establishes a firm reliable interconnection of the band while permitting convenient release when required by insertion of an appropriate tool from the strap end of the band 1 between the toothed surfaces.

The bottom wall 9 of the buckle 5 preferably includes an outer short end tab 17 having a mounting opening 18. The small projection mounting tab 17 is used for hanging of the bands 1 on a suitable wall support for purposes of inventory, storage or the like, by either the retailer or the end user.

The present invention thus provides a simple identification band which can be molded without the formation of special openings in the strap and thus provides a highly economical method of producing leg bands and the like. In the optimum embodiment of the invention, an improved holding action is created.

Various modes in carrying out the invention are contemplated as being within the scope of the following claims, particularly pointing out and distinctly claiming the subject matter which is regarded as the invention.

I claim:

1. An identification band device formed of a suitable flexible material and having a width adapted to receive identifying indicia and a length adapted to permit looping of the band about an object, comprising an elongated band including a flexible strap having a longitudinally extended connecting portion and an interconnected flexible buckle secured to the strap in spaced relation to said connecting portion, said buckle having a bottom wall essentially coplanar with said strap and a pair of side walls spaced laterally of the buckle and the strap to define a lateral opening to the top side of the strap at least as wide as the width of the outer end of the strap, said buckle including an upper wall integrally connected to said side walls and adapted to define an opening of a depth less than the thickness of the connecting portion of the said strap, said bottom wall of said buckle including a plurality of teeth extending longitudinally of the buckle, said strap having a plurality of similar teeth on the underside of the strap and adapted to mate with said buckle teeth and having a top side which is essentially a smooth, flat surface, a centrally located ridge integrally formed on the interior of said upper wall and of a width substantially less than the width of said buckle teeth, said ridge projecting inwardly within the buckle toward said buckle teeth to define said opening having a depth less than the thickness of the connecting strap portion, and said ridge engaging said smooth, flat surface of the strap with the strap connecting portion in said buckle to hold said teeth of said strap in firm interengagement with the bottom wall teeth of said buckle.

2. The band of claim 1 wherein said upper wall is a flexible wall formed deflected slightly inwardly toward the bottom wall with the connecting portion removed from said buckle with the strap connecting portion removed from said buckle.

3. The band of claim 1 wherein said ridge tapers outwardly away from said bottom wall from the outer end of the buckle to the inner end of the buckle.

* * * * *

UNITED STATES PATENT AND TRADEMARK OFFICE
CERTIFICATE OF CORRECTION

PATENT NO. : 4,499,680

DATED : February 19, 1985

INVENTOR(S) : James A. Coburn

It is certified that error appears in the above-identified patent and that said Letters Patent is hereby corrected as shown below:

In Column 2, line 39, Cancel "sufficiently" and substitute therefor ---substantially In Column 4, line 42, Cancel "16" and substitute therefor ---6---

Signed and Sealed this

Fourteenth Day of January 1986

[SEAL]

Attest:

DONALD J. QUIGG

Attesting Officer

Commissioner of Patents and Trademarks